(No Model.)

J. E. DEUPREE.
ANIMAL POKE.

No. 291,702. Patented Jan. 8, 1884.

WITNESSES:
Fred. G. Dieterich

INVENTOR.
John E. Deupree,
By Louis Bagger & Co.
ATTORNEYS.

UNITED STATES PATENT OFFICE.

JOHN E. DEUPREE, OF EDINBURG, INDIANA.

ANIMAL-POKE.

SPECIFICATION forming part of Letters Patent No. 291,702, dated January 8, 1884.

Application filed June 27, 1883. (No model.)

*To all whom it may concern:*

Be it known that I, JOHN E. DEUPREE, a resident of Edinburg, in the county of Johnson and State of Indiana, have invented certain new and useful Improvements in Animal-Pokes; and I do hereby declare that the following is a full, clear, and exact description of the same, which will enable those skilled in the art to which it appertains to make and use the same, reference being had to the accompanying drawings, which form a part of this specification, and in which—

Figure 1:
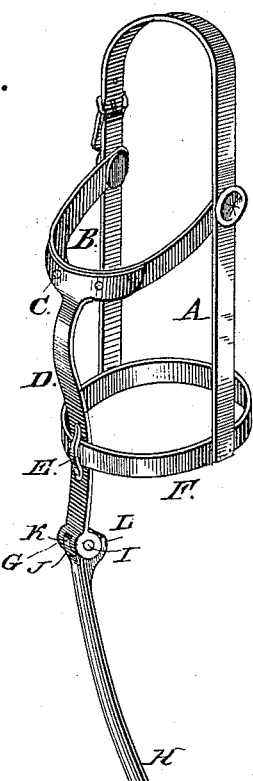
Figure 2:
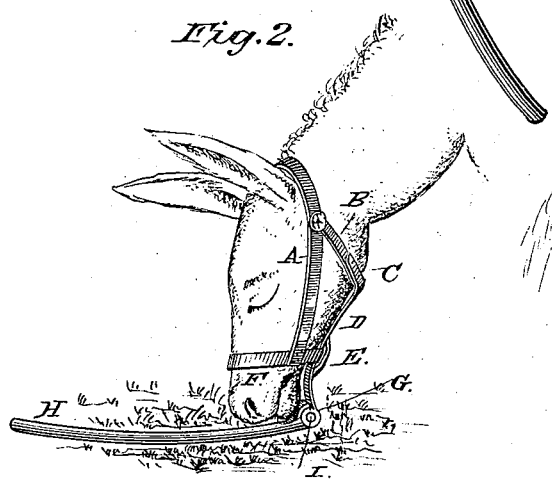
Figure 3:
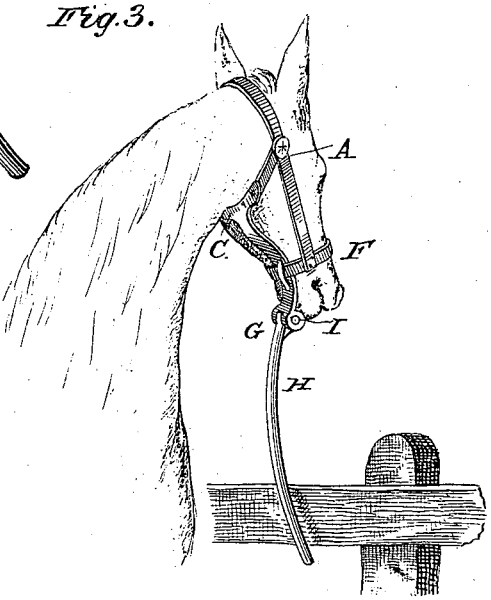

Figure 1 is a perspective view of my improved animal-poke. Fig. 2 is a similar view, showing it in place upon the head of a grazing animal; and Fig. 3 is a similar view, showing it in place upon the head of an animal trying to break a fence.

Similar letters of reference indicate corresponding parts in all the figures.

My invention has relation to that class of animal-pokes which consist of a halter having a downwardly-pending bar adapted to catch in the fence when the animal attempts to jump over it; and it consists in the improved construction and combination of parts of the same, as hereinafter more fully described and claimed.

In the accompanying drawings, the letter A indicates a leather halter, of the usual construction, to the throat-strap B of which is secured the curved head C of a T-shaped flat bar, D, which passes down under the lower jaw of the animal, is provided with a bail, E, near its lower end, through which the chin-strap F passes, and forms a transverse slotted eye, G, at its lower end, to which a curved bar, H, is hinged by a bolt, I, the upper end of the bar forming a flat eye, J, which fits in the slot of the eye. This flat eye forms two shoulders, K and L—one upon each edge of the eye—which limit the swing of the curved bar by bearing against the upper end of the slot in the eye when the bar is swung to either of its limits, the rear shoulder bearing against the end of the slot when the bar depends straight down from the eye of the flat bar, and the forward shoulder bearing against the end of the slot when the bar is swung to a nearly right angle to the flat bar. In this manner it will be seen that the pending bar, the lower end of which is curved forward, will engage with the fence when the animal attempts to jump over it, stopping the animal, the rear shoulder preventing the bar from swinging rearward, which also will prevent the curved bar from swinging far enough back to injure the front legs of the animal, and the forward shoulder will prevent the curved bar from swinging so far forward and upward as to strike the muzzle of the animal, while it will allow it to be laid forward flat upon the ground, allowing the animal to graze.

If desired, the swinging bar may be removed and a common halter strap or rope substituted for the purpose of leading or tying up the animal.

I am aware that it is not broadly new to hinge a bar to the lower end of a bar passing under the jaw of an animal, said bar being secured to a halter; and I do not wish to claim such construction, broadly; but by constructing the bar running under the jaw of the animal with a T-shaped head fitting under the throat of the animal, and bearing, when pressure is brought to bear against the lower end of the hinged bar, against the jaw-bones of the animal, the chin or nose strap will press very hard against the nose of the animal, while the shape of the curved T-head prevents it from injuring the jaw-bones of the animal.

I therefore claim and desire to secure by Letters Patent of the United States—

The combination of a common halter, a flat T-shaped metallic bar forming a curved T-head secured upon the throat-strap, having a bail for the chin-strap, and a slotted eye at its lower end, and a bar provided with a flat eye having shoulders upon its edges, as described, upon its upper end hinged in the slotted eye, and having its lower end curved forward, as and for the purpose shown and set forth.

JOHN E. DEUPREE.

Witnesses:
URIAH C. PRATHERS,
GEO. W. BRODBECK.